1,864,787

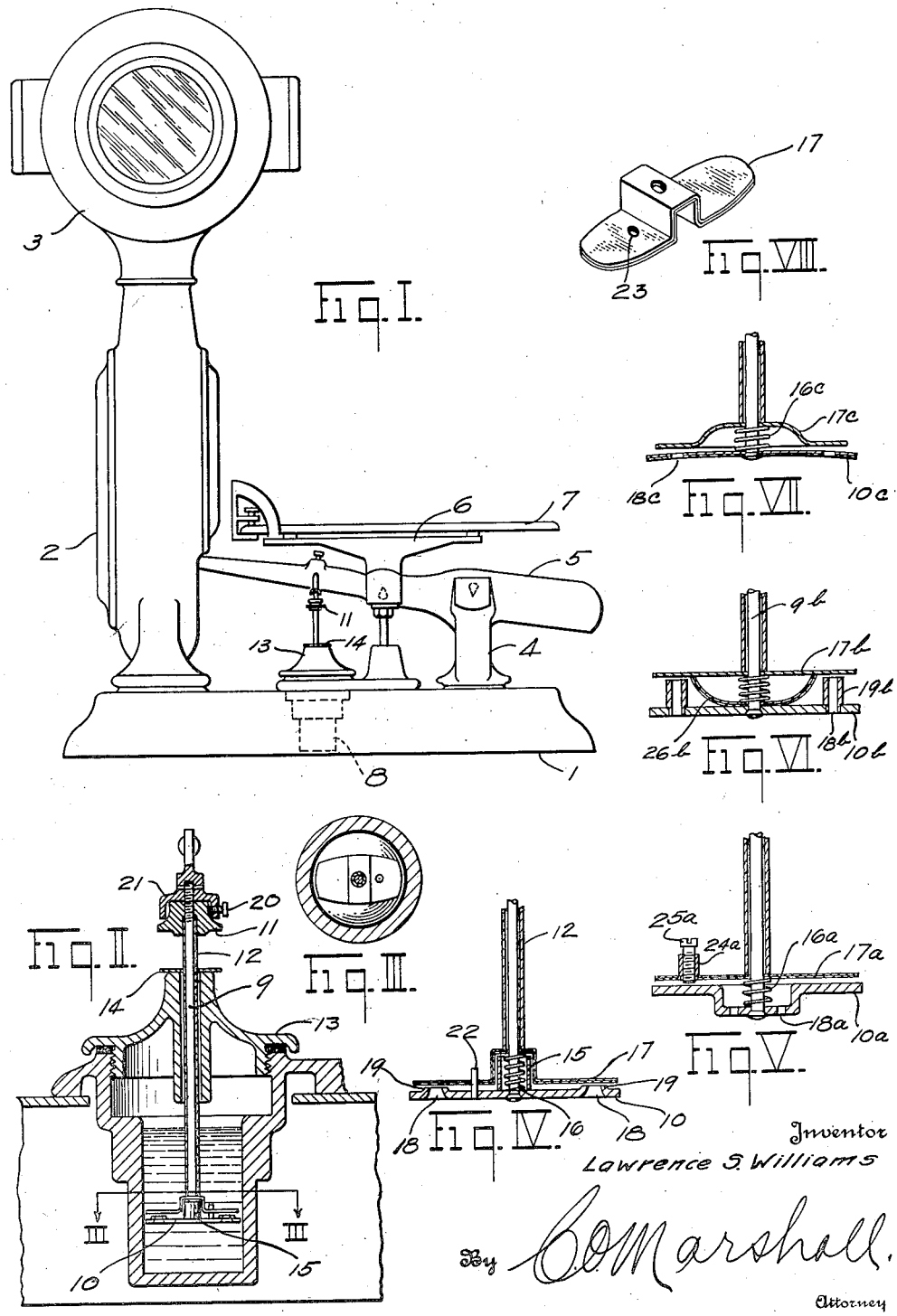
June 28, 1932. L. S. WILLIAMS 1,864,787
DASHPOT FOR WEIGHING SCALES
Filed April 3, 1928
Inventor
Lawrence S. Williams
By C. O. Marshall
Attorney Patented June 28, 1932

UNITED STATES PATENT OFFICE

LAWRENCE S. WILLIAMS, OF TOLEDO, OHIO, ASSIGNOR TO TOLEDO SCALE MANUFACTURING COMPANY, OF TOLEDO, OHIO, A CORPORATION OF NEW JERSEY

DASHPOT FOR WEIGHING SCALES

Application filed April 3, 1928. Serial No. 266,951.

This invention relates to dash pot damping devices for weighing scales, particularly of the type in which the damping medium is a viscous liquid, and its principal object is to provide simple and efficient means to automatically compensate for changes in the viscosity of the damping medium resulting from changes in temperature.

Another object is the provision of a damping device of this character having both an automatic and a hand-operated adjustment.

Another object is the provision of a dash pot plunger having openings for the passage of fluid and simple temperature controlled means for regulating the passage of fluid through such openings.

Another object is the provision of a dash pot plunger having openings for the passage of a viscous fluid and temperature controlled means for varying the area of said openings so as to permit substantially the same rate of flow therethrough notwithstanding considerable changes in viscosity resulting from changes in temperature.

Another object is the provision of a dash pot plunger having means for increasing its retarding effect when subjected to sudden movement in one direction.

Other objects and advantages will be apparent from the following description, in which reference is had to the accompanying drawing illustrating preferred embodiments of my invention and wherein similar reference numerals designate similar parts throughout the several views.

In the drawing:—

Figure I is a side elevational view of a weighing scale embodying a dash pot of my invention;

Figure II is an enlarged fragmentary sectional elevation showing such a dash pot;

Figure III is a sectional plan view taken substantially on the line III—III of Figure II;

Figure IV is a further enlarged fragmentary sectional elevation showing the plunger employed in the dash pot of Figure II;

Figures V, VI and VII are similar views showing modified forms of plungers; and

Figure VIII is a perspective detailed view illustrating a thermostatic element employed in the form of device shown in Figures II, III and IV.

Referring to the drawing in detail, the scale in which the damping device is employed has a base 1 surmounted by an upright housing 2 and cylindrical casing 3 within which automatic load-counterbalancing and indicating mechanism are located.

Fixed upon the base 1 is a fulcrum stand 4 upon which is fulcrumed a platform lever 5 supporting a platform spider 6 and platform 7.

Fixed in the base 1 is a dash pot 8 adapted to contain oil or other viscous fluid and pivotally connected to the lever 5 is a plunger rod 9 to the lower end of which is secured a dash pot plunger 10 which, as the lever 5 swings about its fulcrum, reciprocates within the fluid in the dash pot 8. The dash pot plunger 10 is in the form of a disk of slightly less diameter than the interior cylinder of the dash pot 8 and it is preferably so hung that it remains out of contact with the interior of the dash pot. Threaded upon the upper end of the dash pot plunger 9 is a nut 11 the lower side of which is recessed to receive the upper end of a sleeve 12 loosely surrounding the plunger and extending downwardly through an opening in a dash pot cover 13, the opening being of sufficient dimensions that the tube 12 remains out of contact with the wall thereof. A washer 14, fitting the tube somewhat more closely than the opening in the dash pot cover 13 but loosely enough to permit free reciprocation of the tube and plunger, serves to exclude dust and moisture from the dash pot.

Surrounding the lower end of the plunger rod 9 is a short tube 15 within which and also surrounding the lower end of the plunger rod is an expansive coil 16, the lower end of which engages the upper side of the dash pot plunger 10, while the upper end of the coil engages the lower side of a valve member 17 and forces the valve member 17 against the lower end of the tube 12, thereby forcing the tube 12 against the top of the recess in the nut 11.

The plunger 10 is provided with one or more openings 18 surrounded by upstanding bosses 19 the space between which and the lower face of the valve member 17 forms a constricted passage for liquid from one side of the plunger 10 to the other. By turning the nut 11 up or down on the plunger rod 9 the space between the upper ends of the bosses 19 and the lower side of the valve member 17 may be made greater or less and the freedom with which the dash pot plunger moves within the dash pot may thus be initially adjusted. After proper adjustment is attained the nut 11 may be fixed in position by means of a set-screw 20 threaded through a cap 21 which is fixed to the upper end of the plunger rod 9.

It has been found that liquids which are otherwise suitable as a damping medium for weighing scales and similar devices change their viscosity with changes of temperature. Such changes in viscosity affect the action of the scale. If the temperature rises and the viscosity of the damping medium decreases, the scale will vibrate too freely and will not promptly come to rest in weighing position or in zero position. On the other hand, if the temperature falls and the viscosity of the damping medium increases, the action of the scale will become sluggish. Such changes in the condition of the damping medium are compensated for in damping devices of the prior art by manually increasing or decreasing the size of the openings through which the oil passes as the plunger reciprocates in the dash pot.

In the dash pot damping device of my invention, however, the valve member 17 is made of thermostatic metal, which is a sheet consisting of a layer of copper or other metal having a high coefficient of expansion and a metal or alloy, such as invar, having a low coefficient of expansion, the two layers being integrally joined together. The valve member 17 in the form of device illustrated in Figures II, III and IV is shaped as shown in Figure VIII, the metal having the higher coefficient of expansion being above. As the temperature of the damping medium rises the greater expansion of the upper metal causes the free ends of the valve member 17 to move downwardly toward the bosses 19 which surround the openings 18 and the dash pot plunger 10, thereby decreasing the space through which some of the damping medium passes as the plunger reciprocates in the dash pot. As the temperature falls the greater contraction of the upper metal lifts the ends of the valve member 17 away from the bosses 19, thus permitting the damping medium to flow more freely. The area of the space between the bosses 19 and the valve member 17 is less than the area of the openings 18 and the size of the passage for the liquid, therefore, varies approximately as the distance of the member 17 from the bosses 19.

As the plunger moves up and down in the dash pot the fluid flows around the edge of the plunger as well as through the openings 18 and the cross sectional area of the space around the edge of the plunger remains unchanged. By regulating the flow through the openings 18, however, the total flow is regulated.

In automatic weighing scales the moving parts are arranged to swing through certain limits in counterbalancing and indicating the weight of loads varying from nearly zero to the maximum within the capacity of the scale. Movement of the mechanism beyond zero and full capacity positions would result in injury to pivots and other parts and such movement is, therefore, usually prevented by stops. Violent impact against such stops is, however, also injurious to the mechanism. Such impact seldom occurs at the full capacity limit of movement, because loads exceeding the capacity of the scale are seldom thrown upon the commodity-receiver, but such impacts at the zero limit of movement occur after nearly every weighing when the load is lifted from the platform. In order to retard the movement of the mechanism and minimize the shock on its return to zero position, I have so constructed my dash pot plunger and valve that the passage for the fluid is automatically restricted to prevent a sudden return movement. In the form of device illustrated in Figures II, III, IV and VIII the valve member 17 is so constructed that it yields under a sudden upward or return movement of the plunger and decreases the size of the passage between the lower face of the member 17 and the bosses 19. The more sudden the movement the greater the restriction of the passages. The scale mechanism is thus permitted to move promptly to weighing position under the influence of a load on the platform, but is prevented from a violent return to zero position when the load is removed.

In order to prevent the valve member 17 from turning about the plunger stem 9 and thus uncovering the openings 18, a pin 22 is fixed in the dash pot plunger 10 and passes freely through an opening 23 in the valve member.

In the form of device shown in Figure V the plunger $10^a$ is shaped with a depression at its center which contains openings $18^a$ and the valve member $17^a$ is flat, the depression in the plunger $10^a$ providing space for the expansive coil $16^a$. The valve member $17^a$ is in this form of the device also made of thermostatic metal, with the layer having the greater coefficient of expansion above. As the temperature rises the member $17^a$ bends and the opening between its edge and the upper side of the dash pot plunger $10^a$ decreases. The member $17^a$ also springs downwardly toward the plunger $10^a$ on the upward back stroke of the plunger and thus prevents a violent return of the weighing mechanism to zero position. In order to insure a suitable minimum opening between the member 17ᵃ and the plunger 10ᵃ, an adjustable spacing screw 24ᵃ is threaded through a sleeve 25ᵃ fixed to the valve member 17ᵃ and extends into proximity to the upper surface of the dash pot plunger 10ᵃ. For clearness of illustration the relative distance between the valve member 17ᵃ and the plunger 10ᵃ has in Figure V been somewhat exaggerated.

In the form of device shown in Figure VI the dash pot plunger 10ᵇ and the valve member 17ᵇ are flat and the bosses surrounding the openings 18ᵇ are in the form of short sleeves 19ᵇ. The temperature controlled action of the valve is accomplished by means of a separate actuating device 26ᵇ in the form of a bowed strip of thermostatic metal interposed between the dash pot plunger 10ᵇ and the valve member 17ᵇ and having an opening in its center which receives the plunger rod 9ᵇ. In this modification the layer having the greatest coefficient of expansion is above. As the temperature rises the greater expansion of the upper layer causes the actuating element 26ᵇ to straighten somewhat, thus permitting the resilient valve member 17ᵇ, the ends of which are forced slightly away from the upper ends of the sleeve 19ᵇ, to spring downwardly and restrict the flow of fluid through the openings 18ᵇ.

In the form of device shown in Figure VII the plunger 10ᶜ is itself formed of resilient thermostatic metal, the valve member 17ᶜ being slightly bell shaped to provide rigidity and space for the expansive coil 16ᶜ. In this modification of the device the layer of the metal from which the plunger 10ᶜ is formed having the greatest coefficient of expansion is below. As the temperature rises it expands and moves the outer portion of the plunger 10ᶜ upwardly toward the under side of the outer portion of the valve member 17ᶜ, thus restricting the flow of fluid through the opening 18ᶜ.

The embodiments of my invention herein shown and described are to be regarded as illustrative only, and it is to be understood that the invention is susceptible to variation, modification and change within the spirit and scope of the subjoined claims.

Having described my invention, I claim:

1. In a device of the class described, in combination, a plunger member, a valve member, one of said members having ports therein, and temperature controlled means for moving said members toward or away from each other, one of said members being resilient whereby it may be forced toward the other by movement in one direction through a fluid.

2. In a device of the class described, in combination, a plunger member, a valve member, one of said members having ports therein, the other of said members having a flat surface overlying said ports, and temperature controlled means for moving said flat surface and said ports toward or away from each other, one of said members being resilient whereby it may be forced toward the other by movement in one direction through a fluid.

3. In a device of the class described, in combination, a plunger member, and a valve member, one of said members having ports therein, the other member having a flat surface overlying said ports, one of said members being made of thermostatic metal whereby said flat surface and said ports are moved toward or away from each other by changes in temperature.

4. In a device of the class described, in combination, a plunger member and a valve member, one of said members having ports therein, the other member having a flat surface overlying said ports, one of said members being made of thermostatic metal whereby said flat surface and said ports are moved toward or away from each other by changes in temperature, the member made of thermostatic metal being resilient whereby it may be forced toward the other member by movement in one direction through a fluid.

5. In a device of the class described, in combination, a plunger member having ports therein, and a valve member having a flat surface overlying said ports, said valve member being made of thermostatic metal whereby said flat surface is moved toward said ports by increase in temperature and away from said ports by decrease in temperature.

6. In a device of the class described, in combination, a plunger member having ports therein, and a valve member having a flat surface overlying said ports, said valve member being made of thermostatic metal whereby said flat surface is moved toward said ports by increase in temperature and away from said ports by decrease in temperature, said valve member being resilient whereby its flat surface may be forced toward said ports by movement in one direction through a fluid.

7. In a device of the class described, in combination, a plunger member having ports, bosses on said plunger member surrounding said ports, and a valve member having a flat surface overlying said bosses, said valve member being made of thermostatic metal.

8. In a device of the class described, in combination, a plunger member having ports, bosses on said plunger member surrounding said ports, and a valve member having a flat surface overlying said bosses, said valve member being made of thermostatic metal and being resilient.

9. In a device of the class described, in combination, a plunger member having ports, and a valve member made of thermostatic metal having a central part connected to said plunger and wings overlying said ports and movable toward and away therefrom.

10. In a device of the class described, in combination, a plunger member having ports surrounded by bosses, and a valve member made of thermostatic metal having a central portion connected to said plunger member and wings overlying said bosses.

11. In a device of the class described, in combination, a plunger member having ports, bosses surrounding said ports, and a valve member made of thermostatic metal having a bent-up central portion connected to said plunger member and wing portions overlying said bosses.

12. In a device of the class described, in combination, a plunger member having ports surrounded by bosses, and a valve member made of thermostatic metal having a bent-up central portion and wing portions overlying said bosses.

13. In a device of the class described, in combination, a plunger member having ports, a valve member made of thermostatic metal, a resilient member interposed between said plunger member and said valve member and tending to separate them, and manually operable means for forcing said plunger member and said valve member toward each other against the resistance of said resilient member.

14. In a device of the class described, in combination, a plunger member having openings therein, said openings being surrounded by bosses, a valve member made of thermostatic metal having a bent-up central portion and wings overlying said bosses, a resilient member located between said plunger and the bent-up portion of said valve member and tending to force said members away from each other, and manually operable means for forcing said plunger and valve members toward each other against the resistance of said resilient member.

15. In a device of the class described, in combination, a plunger rod, a plunger member fixed thereto, said plunger member having ports therein surrounded by bosses, and a valve member having a central portion connected to said plunger rod and wing portions overlying said bosses.

16. In a device of the class described, in combination, a plunger rod, a plunger member secured thereto, said plunger member having a port, and a valve member made of thermostatic metal having a portion connected to said plunger rod and a wing portion overlying said port.

17. In a device of the class described, in combination, a plunger rod, a plunger member fixed to one end thereof, said plunger member having ports surrounded by bosses, a valve member made of thermostatic metal, said valve member having a bent-up central portion and wing portions overlying said bosses, a resilient member interposed between said plunger member and the bent-up portion of said valve member, a sleeve surrounding said plunger rod and engaging the bent-up portion of said valve member, and a nut threaded on said plunger rod and engaging said sleeve.

18. In a device of the class described, in combination, a plunger rod, a plunger member fixed to one end thereof, said plunger member having ports surrounded by bosses, a valve member made of thermostatic metal, said valve member having a bent-up central portion and wing portions overlying said bosses, a resilient member interposed between said plunger member and the bent-up portion of said valve member, a sleeve surrounding said plunger rod and engaging the bent-up portion of said valve member, and a nut threaded on said plunger rod and engaging said sleeve, said valve member being resilient and thereby adapted to be forced toward the bosses on said plunger member by movement through a fluid in one direction.

19. In a device of the class described, in combination, a plunger member, a valve member, one of said members having ports therein, the other of said members having flat surfaces overlying said ports, one of said members being made of thermostatic metal whereby said flat surfaces and said ports are moved toward or away from each other by changes in temperature, and manually operated means by which said flat surfaces and said ports may be adjusted toward or away from each other.

LAWRENCE S. WILLIAMS.